(12) United States Patent
Serapin et al.

(10) Patent No.: US 10,482,537 B2
(45) Date of Patent: Nov. 19, 2019

(54) SYSTEM AND METHOD FOR BUNDLING INSURANCE PRODUCTS

(71) Applicant: STATE FARM MUTUAL AUTOMOBILE INSURANCE COMPANY, Bloomington, IL (US)

(72) Inventors: Arlene Serapin, Normal, IL (US); Pawn Johnson-Paul, Bloomington, IL (US); Robert Albert, Bloomington, IL (US); Twanna Edwards, Normal, IL (US); Tracy Warne, Bloomington, IL (US); Lisa Bianco, Bloomington, IL (US); Elizabeth Orzolek, Normal, IL (US); Mark R. Yoder, Bloomington, IL (US); David B. Christensen, Gilbert, AZ (US); Dustin Mardis, Bloomington, IL (US); Benjamin R. Murphy, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 67 days.

(21) Appl. No.: 14/723,739

(22) Filed: May 28, 2015

(65) Prior Publication Data

US 2016/0071220 A1 Mar. 10, 2016

Related U.S. Application Data

(60) Provisional application No. 62/046,028, filed on Sep. 4, 2014.

(51) Int. Cl.
*G06Q 40/08* (2012.01)
*G06Q 30/02* (2012.01)

(52) U.S. Cl.
CPC ......... *G06Q 40/08* (2013.01); *G06Q 30/0222* (2013.01)

(58) Field of Classification Search
CPC ..................................................... G06Q 40/00
(Continued)

(56) References Cited

U.S. PATENT DOCUMENTS

2007/0208606 A1* 9/2007 MacKay ............... G06Q 10/06
705/7.15
2011/0125537 A1* 5/2011 Reynolds .............. G06Q 10/10
705/4

(Continued)

OTHER PUBLICATIONS

West Bend Mutual prospers by focusing on niche; Insurance company sells combined auto, home policies Author: Gores, Paul. Publication info: Milwaukee Journal Sentinel [Milwaukee, Wis] Feb. 24, 2008: (Year: 2008).*

*Primary Examiner* — Bruce I Ebersman
*Assistant Examiner* — John A Anderson
(74) *Attorney, Agent, or Firm* — Marshall, Gerstein & Borun LLP

(57) ABSTRACT

A computer-implement method may bundle insurance and financial products, and visually depict a current status for an application for each product within the bundle, such as applications related auto, home, life, or renters insurance, and/or vehicle loans. In one aspect, the method may determine a standard status icon or message for each product. A data server may receive a customer identification and selection of a first product offered, and determine a context of an application for the first product, wherein the context represents a state of progress of the application for the first product, and determine a standard status of the application corresponding to the context. The status is selected from a group of statuses standardized across two or more product lines sold by the company. The data server may further (Continued)

generate a status message including the status of the application and transmit the status message to a client device.

15 Claims, 7 Drawing Sheets

(58) Field of Classification Search
USPC .............................................................. 705/4
See application file for complete search history.

(56) References Cited

U.S. PATENT DOCUMENTS

| | | | |
|---|---|---|---|
| 2014/0039935 A1* | 2/2014 | Rivera | G06Q 40/08 705/4 |
| 2014/0195412 A1* | 7/2014 | Metz | G06Q 40/025 705/38 |
| 2015/0019265 A1* | 1/2015 | Roll | G06Q 40/06 705/4 |
| 2015/0178849 A1* | 6/2015 | Berger | G06Q 40/08 705/4 |

* cited by examiner

| Scenario | Standard Status |
|---|---|
| Application is Started and Saved, but Not Submitted. | In Process |
| Application was pre-approved, the customer/sales associate has made changes to pursue a loan, and submitted changes | In Process |
| The application has been submitted for a decision. Indication that there are inconsistencies with applicants' information. | In Process |
| Application has been submitted for a decision and is being manually reviewed by an underwriter. | Under Review |
| Application is Pre-Approved | In Process |
| Application is approved. Loan figures have been customized. Agent is not amd66 compliant. (stop short of signing) | In Process |
| The application has been submitted for a decision and customer action is needed in order to make a decision (e.g. proof of income, etc.). | In Process |
| Application is Declined | Complete |
| Application is approved. Payoff Amount is NOT applicable. | In Process |
| Application is approved. Payoff is required. The user has triggered the Bank to obtain the Payoff, but the Payoff has not been obtained by the Bank. | In Process |
| Customer exits an approved application without choosing an offer | In Process |
| Application is approved. A payoff amount is required for the scenario and the payoff amount has been entered. | In Process |
| Application is approved. A payoff amount cannot be obtained by the Bank since a verbal confirmation or conference call is required. | In Process |
| Customer exits after selecting a term without signing | In Process |
| Application requires Pre-Closing to be provided before proceeding. | In Process |
| Application requires Closing Supporting Documents to be provided before proceeding. | In Process |

FIG. 4

SYSTEM AND METHOD FOR BUNDLING INSURANCE PRODUCTS

CROSS-REFERENCE TO RELATED APPLICATION

This application claims priority to U.S. Provisional Application No. 62/046,028, filed Sep. 4, 2014, which is incorporated by reference herein in its entirety.

TECHNICAL FIELD

The present disclosure generally relates to a system and method for determining a standard status of a product or a group of products, determining a standard status message and presenting the standard status message to a user, such as on a user interface.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Traditionally, in order for a customer to view the status of an insurance product, the customer would have to contact an agent for updates on status and information. In addition, the agent would receive updates through their morning reports and contact the customer as needed. Furthermore, the agent may use individual software applications to view the status for each product.

SUMMARY

The present embodiments may dynamically display the current status of specific products (including insurance products) that an individual customer has indicated an interest in buying. A unified view on a user interface of several products may present information to the user in an organized manner. The different status of different products may be graphically or visually represented and/or differentiated. In one embodiment, the bundling of products may affect, such as reduce, the price of other products being offered to the customer. An integrated view that seamlessly conveys the updated pricing information and options to the user in a manner that is readily comprehensible may be provided.

In one aspect, a computer-implemented method for determining a standard status for a product, such as a single product within a group of products, may be provided. The method may include receiving, via a computer network, a customer identification and a selection of a first product offered by a company corresponding to the customer identification. The method may further include determining, by one or more processors, a context of an application for the first product, wherein the context represents a state of progress of the application for the first product and determining, by the one or more processors, a standard status of the application corresponding to the context, wherein the standard status is selected from a group of statuses standardized across two or more product lines sold by the company. The method may also include generating, by the one or more processors, a status message including the status of the application; and/or transmitting, via the computer network, the status message to a client device for presentation on a display screen associated with the client device. The method may include additional, fewer, or alternate actions, including those discussed elsewhere herein.

In another aspect, a computer device for determining a standard status for a product, such as a single product within a group or bundle of products, may be provided. The computer device may include one or more processors; and one or more memories coupled to the one or more processors. The one or more memories may include non-transitory computer executable instructions stored therein that, when executed by the one or more processors, may cause the one or more processors to: (a) receive, via a computer network, a customer identification; (b) receive, via the computer network, a selection of a first product offered by a company corresponding to the customer identification; (c) determine a context of an application for the first product, wherein the context represents a state of progress of the application for the first product; (d) determine a standard status of the application corresponding to the context, wherein the standard status is selected from a group of statuses standardized across two or more product lines sold by the company; (e) generate a status message based upon the determined standard status, the status message including the status of the application; and/or (f) transmit, via the computer network, the status message to a client device for being presented on a display screen of a computing device, such as a mobile device or smart phone. The computer device may include additional, fewer, or alternate components and/or functionality.

In another aspect, a computer-implemented method of dynamically displaying the current status of various insurance product (or service) offerings and/or associated applications to a user may be provided. The method may include (1) displaying a visual, textual, or graphical representation of a first insurance product (or service) and/or an associated first application on a display screen and/or user interface; (2) displaying a visual, textual, or graphical representation of a first status indicator on the display screen, the first status indicator representing a current status of the first insurance product (or service) and/or the associated first application on the display screen and/or user interface; (3) displaying a visual, textual, or graphical representation of a second insurance product (or service) and/or an associated second application on the display screen and/or user interface; and/or (4) displaying a visual, textual, or graphical representation of a second status indicator on the display screen and/or user interface, the second status indicator representing a current status of the second insurance product (or service) and/or the associated second application. The bundling or purchasing together of the first and second insurance products (or services) may reduce the overall cost of the first and second insurance products (or service) when compared to individually purchasing the first and second insurance products (or services), and a cost savings associated with the bundle may be displayed. The method may allow the user to purchase a bundle of insurance or financial-related products or services via the display screen and/or user interface, such as a bundle including the first and second insurance products (or services). The method may allow the user to alter the scope and/or coverages of the insurance and/or financial-related products (or services) via operations performed on the user interface, such as by mouse click or touch screen. The first and second insurance products (or services) may relate to auto, home, life, renters, and/or other types of insurance, and/or financial products, such as vehicle or personal loans. The first and second status indicators may include and/or indicate "Ready to Apply,"

"Not Started," "In Progress," "In Underwriting," "Ready to Customize," "Ready for Purchase," "On Hold," "Pending," "Contact Us," "More Information Needed," and/or another status, such as another status related to the products (or services) and/or an application for such products (or services). The method may include additional, fewer, or alternate actions, including those discussed elsewhere herein.

In another aspect, a graphical user interface for the online selling of a bundle of insurance-related (and/or financial-related) products or services may be provided. The graphical user interface may depict: (a) a graphical or visual representation of more than one insurance-related product or service (and/or corresponding application for such product or service); and/or (b) a graphical or visual representation of a current status for each of the more than one insurance-related product or service (and/or corresponding application for such product or service). The current status may depict a periodic payment or premium for a respective insurance-related product or service and/or a state of progress with respect to completing a purchase of (and/or application for) the respective insurance-related product or service. The graphical user interface may be configured to accept user modifications to each of the more than one insurance-related products or services, and each user modification may impact an overall price that the user will be charged if the bundle of insurance-related products or services is purchased together via the graphical user interface. The current status may be depicted by a status indicator that indicates "Ready to Apply," "Not Started," "In Progress," "In Underwriting," "Ready to Customize," "Ready for Purchase," "On Hold," "Pending," "Contact Us," and/or "More Information Needed." The user interface may include additional, less, or alternate functionality, including that discussed elsewhere herein.

BRIEF DESCRIPTION OF THE DRAWINGS

FIG. 4 depicts a table of example scenarios and standard status messages for an insurance product application;

Figure 1:
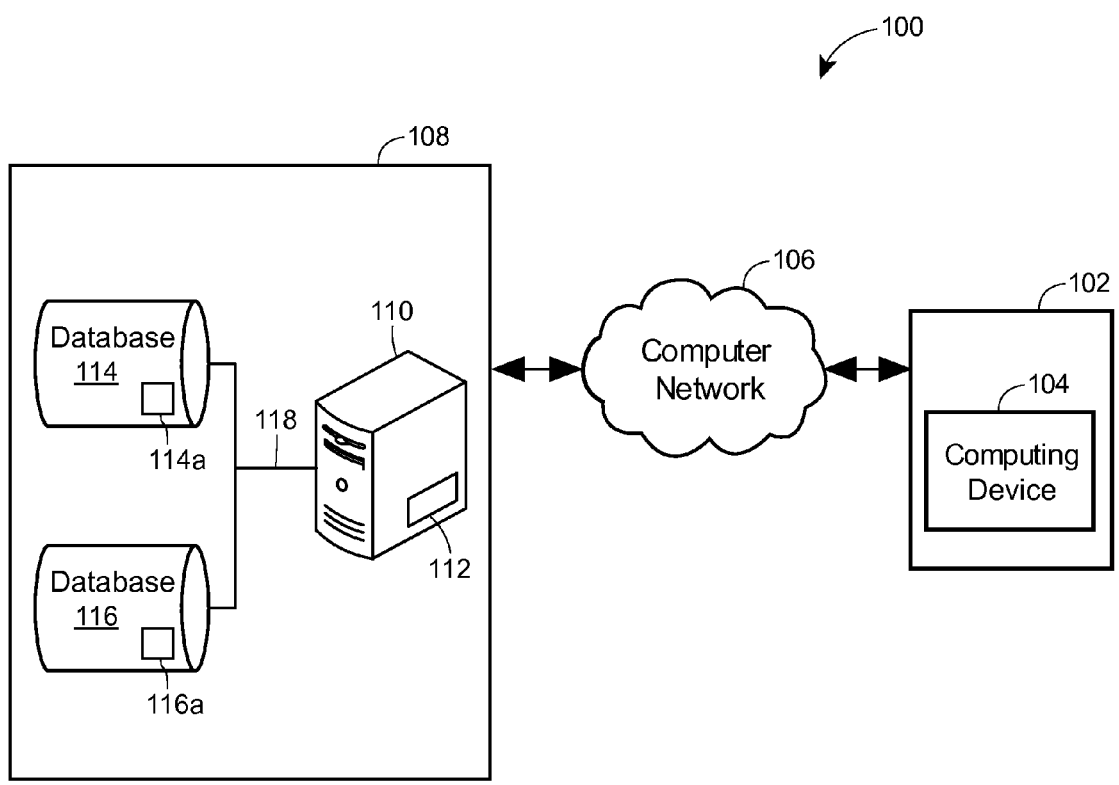
FIG. 1 is a simplified and exemplary block diagram of a system for determining a standard status.

The Figures depict a preferred embodiment of the present invention for purposes of illustration only. One of ordinary skill in the art will readily recognize from the following discussion that alternative embodiments of the structures and methods illustrated herein may be employed without departing from the principles of the invention described herein.

DETAILED DESCRIPTION

A system and method may relate, inter alia, to the bundling of products, and graphically or visually presenting and/or otherwise depicting application or purchase status information for the bundle of products to users via a display screen. The status information may relate to a current status of an insurance and/or financial product, and/or related application for such products, such as an application for auto insurance, home insurance, life insurance, renters insurance, various loans, such as vehicle, home, and/or personal loans, and/or other products.

In one aspect, the present embodiments may include a virtual hub that provides an integrated view of insurance and/or financial-related products to users, such as customers or insurance agents. As an example, a display screen and/or user interface may display the current status of two or more products associated with the user or that the user has indicated an interest in, such as auto insurance, life insurance, home insurance, and/or a vehicle or personal loan. The current status of each product (or an application for each product) may be displayed on the screen or user interface. The current status may be represented by an icon or text, and may be located near an associated icon or text representing each of the products, such as auto insurance, life insurance, home insurance, and/or a vehicle or personal loan, in the present example.

Noted above, the current status of application for an insurance or other product may be displayed on the display screen and/or user interface. The current status may be displayed as text, such as "Ready to Apply," "Not Started," "In Progress," "In Underwriting," "Ready to Customize," "Ready for Purchase," "On Hold," "Pending," "Contact Us," "More Information Needed," and/or other status. Additionally or alternatively to text, the current status may be displayed graphically as an icon. The text and/or icon may be colored coded, such as green for "Ready for Purchase," red for "On Hold," grey for "Pending," etc. The font of any text may also be different for different statuses, such as italic for "In Progress," and/or bold for "Ready to Customize" and/or "Ready for Purchase."

In one aspect, standard status names may be used by the present embodiment. Standard status names may be been established across all lines of business in the insurance and/or financial sectors of a company to allow for the customer to easily determine the state of their request for a product or service.

The present embodiment may relate to providing visual representations of the status of the purchasing the product or service. In addition to the written status, there may be sections on a "hub" or user interface that allow the customer and/or a company representative (of the product or service provider) to determine if further action is needed. For example, a "save for later" section may be included to allow the customer or company representative to see that they have started a request, but are not considering it at the present time. This functionality may allow users to save for later (their progress of filling an application for an insurance product, for example) without having to re-enter the data. It may also allow for a centralized location to view all product (or service) statuses, no matter the product (or service) line (e.g., bank, insurance, mutual funds, annuities/financial products, etc.).

The present embodiments may provide one or more statuses for viewing by the user that are standardized across product (or service) lines no matter whether the status is viewed internally or externally to the product or service provider. With conventional techniques, a sales professional may have to go to individual software applications to view the statuses for those products. On the other hand, with the present implementation of the system and method disclosed herein, sales personnel may go to one central location (or online hub) to view the status of all products or services (e.g., insurance, bank, mutual funds, financial products) that a user may have expressed interest in, or other be interested in purchasing.

Also, with conventional techniques, customers may not have the ability to view a status. On the other hand, with the implementation of the present embodiments, customers may be able to view the present status of any product or service (or related application for such items). The status for one or more products or services (or related applications) may be displayed on a display screen and/or user interface.

The present embodiments may also include a pending section and/or pending functionality. This section and/or functionality may be added to the hub or user interface to allow the customer or company sales representative to see that the company is processing the product or service request (or application), and/or that no further action is needed. Once an item is processed by the company, the user interface may be updated to reflect that the product or service has moved to the next status that is applicable, and/or has moved to the correct section on the page. Pended functionality may also be utilized in the event that moratoriums or other types of limits on sales are put in place while the event is occurring.

The present embodiments may also include triggering action functionality. The statuses may trigger notifications, events, and opportunities, and/or assist with managing the workload within the company or product/service provider. For example, if the status was "in-progress," this may trigger an opportunity or notification that is sent to the sales representative to let them know that an individual has been provided a quote online, and/or started an application (such as online) in which they are named the sale representative or agent. The notification may allow the sales representative or agent the opportunity to initiate contact with the individual (actual or potential customer) to utilize this saved item as a lead.

I. Exemplary Standard Status

In one aspect, a system and method may be provided that determine a standard status for a product or service (and/or an associated application). The present embodiments may include recognizing what state a product, quote, application, claim, service request, etc. is in and providing a visual representation of the status to the customer. Furthermore, some embodiments may use standard status names established across different business lines (such as the insurance and/or financial sectors). In this manner, the customer may readily determine whether the product it is "In Progress," "On Hold," "Pending," "Submitted," "In Underwriting," and/or another pre-defined or pre-determined status, including those discussed elsewhere herein.

The present embodiments may also provide a unified product page to view the statuses of different product lines offered by a company (e.g., auto, home, and/or life insurance, bank, mutual funds, annuities, financial products, loans, etc.). In addition to the written status, the system and method may allow a user to determine if further action is needed. The status may allow the customer or agent to see if a request for a product or service is processing, and/or if further action is needed.

The system and method may still further determine if the standard status triggers an action, such as notifications, events, opportunities, moratoriums, and/or may assist with managing the workload within the company (such as an insurance provider). For example if the status is "in-progress," a company agent may be notified that the customer has been provided a quote online, and/or started an application (such as an application for auto, home, or life insurance) in which the agent is named. This notification may allow the agent the opportunity to initiate contact with the individual (either an existing or potential customer) to utilize the saved item as a lead.

II. Exemplary Standard Status Message Determination

FIG. 1 illustrates various aspects of an exemplary architecture for implementing a system for determining a standard status 100. The high-level architecture includes both hardware and software applications, as well as various data communications channels for communicating data between the various hardware and software components. The system for determining a standard status 100 may include various software and hardware components or modules that may employ a method to analyze and process images, such as satellite images, high resolutions images and other types of images. The various modules may be implemented as computer-readable storage memories containing computer-readable instructions (i.e., software) for execution by a processor of the system for determining a standard status 100.

A. Exemplary Front End Components

The system for determining a standard status 100 may include front end components 102, including a computing device 104 that may execute instructions for performing a quote application process, accessing a standard status of a product, etc. The computing device 104 may include a personal computer, smart phone, tablet computer, or other suitable computing device. Those skilled in the art will recognize that the present system may be used in a dedicated application, a web browser, a combination thereof, etc.

In some embodiments, the computing device 104 connects to a computer network 106, such as the Internet or other type of suitable network (e.g., local area network (LAN), a metropolitan area network (MAN), a wide area network (WAN), a mobile, a wired or wireless network, a private network, a virtual private network, etc.). The computing device 104 may connect to back end components 108 via the computer network 106.

B. Exemplary Back End Components

The back end components 108 may include a server 110 that may include one or more computer-executable instructions 112 for determining and presenting a standard status. The back end components 108 may also include a database 114 that stores data 114a associated with a customer. The database 114 may also store other data such as standard statuses, products associated with a customer account, etc. The customer database 114 may include a data storage device such as random-access memory (RAM), hard disk drive (HDD), flash memory, flash memory such as a solid state drive (SSD), etc. The back end components 108 may further include one or more additional databases 116 for storing other data 116a. The back end components may communicate with each other through a communication network 118 such as a local area network or other type of suitable network (e.g., the Internet, a metropolitan area network (MAN), a wide area network (WAN), a mobile, a wired or wireless network, a private network, a virtual private network, etc.).

The exemplary system 100 shown in FIG. 1 may include additional, fewer, or alternate components, including those discussed elsewhere herein.

III. Exemplary Flowchart for Determining Status Message

Figure 2:
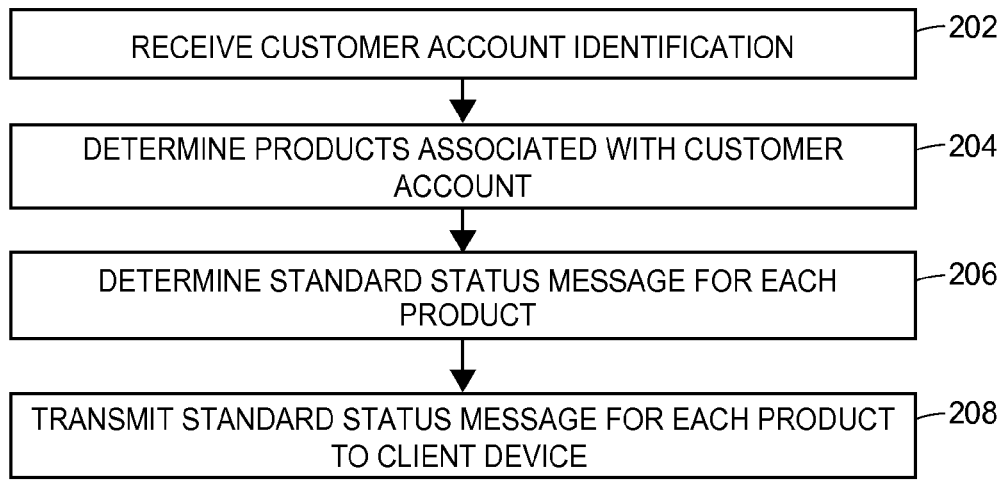
FIG. 2 is a flow chart illustrating an exemplary method for determining a standard status message for a product.

FIG. 2 is a high level flow chart of an exemplary method, routine or process 200 for determining a standard status message for a product. A user, such a customer of the company, a holder of an insurance policy of the company, a beneficiary of a policy, a claimant, an insurance agent associated with the company or some other employee or independent contractor affiliated with the company, may use a client device, such as the computing device 104 illustrated in FIG. 1, to access a company program. The company program may be a website hosted on one or more servers, such as the server 110, described in reference to FIG. 1.

One aspect of the method may include an "authenticated user" scenario. The user may enter an input, via a mouse click, touch press, keyboard click, etc., representing a customer account identification. For example, the customer account identification may be a customer name associated with a company account, a user name of the customer account, etc. In some embodiments, the user may be a customer entering a user account credential. In other embodiments, the user may be an agent, company employee, etc. entering a user identification to see all products associated with a particular company. In some embodiments, the server may also execute an instruction to verify the customer account credentials via the use of a password or other verification technique. In any event, the customer account identification is received by the server (block 202) and a processor of the server may execute an instruction to determine one or more products associated with the user account (block 204). For example, the customer associated with the customer account identification may have purchased one or more products from the company, may be in the process of purchasing one or more products from the company, receiving a quote on the one or more products, etc. In some embodiments, the methods discussed may also be used to determine a standard status for a quote, application, claim, service request, etc.

An alternative aspect of the method may include an "unauthenticated user" scenario. A user may receive a quote for one or more products without entering any information about themselves. Alternatively, the user may receive a quote for one or more products by entering only generic information, and not information identifying themselves, such as information as to what type of insurance they are interested in purchasing, where they live, their age and marital status, number of dependents, type of vehicle they own, features of their house, their life style, and/or other insurance-related questions.

The processor may further execute an instruction to determine one or more standard status messages for each product (block 206). As will be discussed in further detail below, the standard status messages correspond to the status of the product. In some embodiments, the status may be the real time status of the product. For example, the status of the product may be selected from the following statuses: in process, pending, under review (by an agent, other employee, etc.), complete, approved, not started, customer action needed, etc. The processor may also execute an instruction to transmit the standard status message for each product for display on the client device (block 206). Once received, the client device may transmit the message within a viewport of the display of the client device. The exemplary method 200 may include additional, fewer, or alternate actions, including those discussed elsewhere herein.

IV. Exemplary Flowchart for Determining a Standard Status

Figure 3:
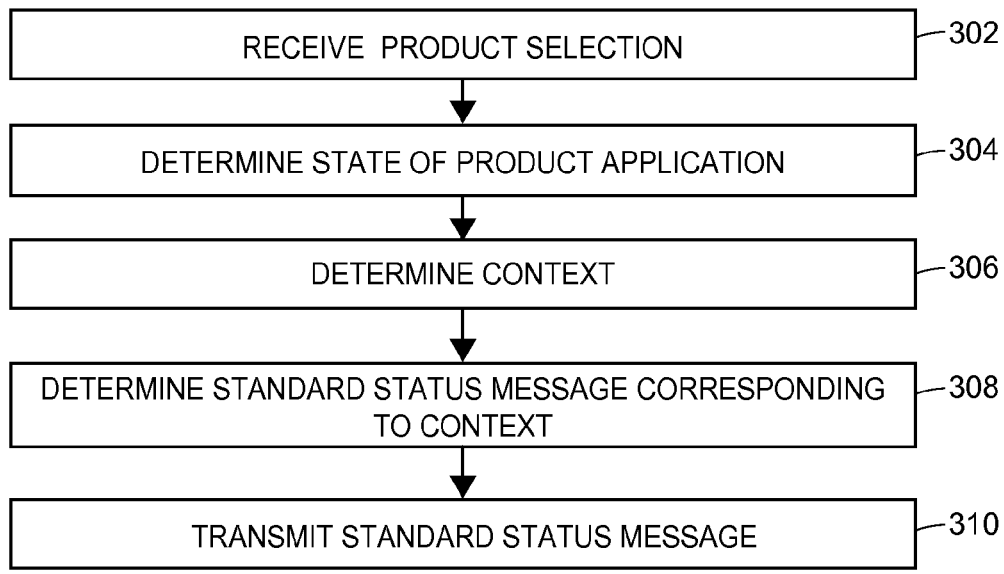
FIG. 3 is a flow chart illustrating an exemplary method for determining a standard status for a product.

FIG. 3 is a high level flow chart of a method, routine or process 300 for determining a standard status for a product. A user, such a customer of the company, a holder of an insurance policy of the company, a beneficiary of a policy, a claimant, an insurance agent associated with the company or some other employee or independent contractor affiliated with the company, may use a client device, such as the computing device 104 illustrated in FIG. 1 to access a company program. The company program may be a website hosted on one or more servers, such as the server 110, described in reference to FIG. 1. Furthermore, the servers may include one or more instructions to execute an interface for purchasing and quoting insurance products.

The processor of the server may receive an indication of a first product (block 302). For example, the product may be an insurance product, mutual fund product, a loan product, etc. Although the method 300 is described in reference to a product, those of ordinary skill in the art will recognize that the method 300 may also be used with other services provided by the company, such as a quote, a claim, a request, etc. The processor may also execute an instruction to determine a current context of the product application (block 304) and a scenario corresponding to the current context (block 306). The processor may further execute an instruction to determine a standard status message corresponding to the scenarios (block 308).

V. Exemplary Listing of Standard Statuses

Turning briefly to FIG. 4, a list 400 of possible scenarios 402 and associated standard statuses 404 for an insurance product application are listed. Of course the scenarios on this list are only examples and those of ordinary skill in the art will recognize that a variety of statuses may be used. In some embodiments, the status messages may be standardized across different product lines. For example, the same status messages may be standardized across financial product lines (such as loans) and insurance product lines (such as car insurance). Accordingly, the work flow of each business line may be mapped to the standard statuses. The exemplary list 400 may include additional, fewer, or alternate statuses, including those discussed elsewhere herein.

The processor may further execute an instruction to transmit the standard status message for each product for display on the client device (block 310). In some embodiments, one or more steps of the method 300 may be repeated for each product associated with the user identification.

VI. Exemplary User Interface and Related Functionality

Figure 5A:
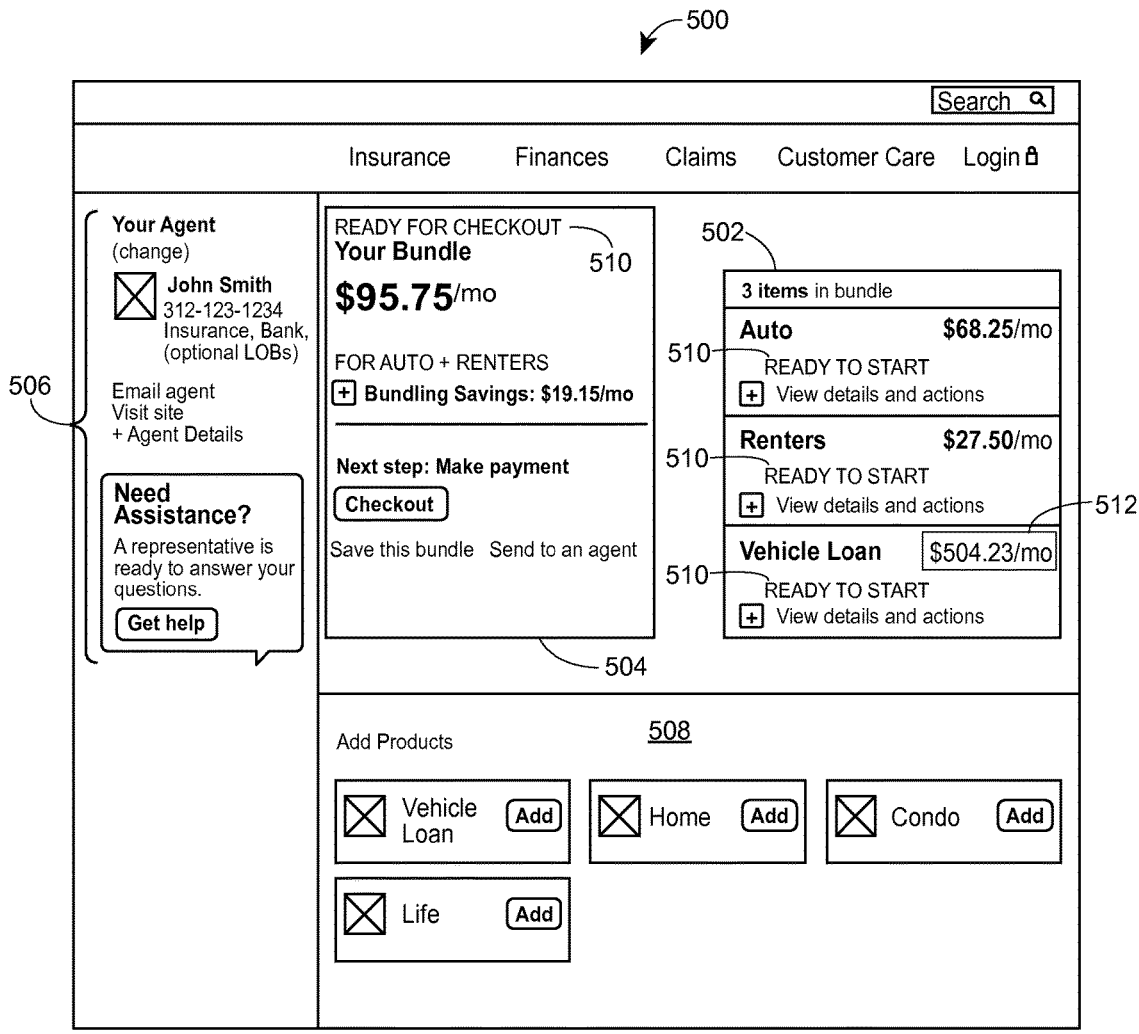
FIG. 5A illustrates an example unified product page where standard status messages may be displayed.

In one aspect, a user interface for purchasing and reviewing products and product bundles may be provided. FIG. 5A illustrates an exemplary user interface and related functionality of an example unified product page 500. The unified product page 500 may include functionality for presenting (1) a product bundle area 502; (2) a bundle checkout area 504; (3) agent information area 506; and/or (4) additional product area 508. The unified product page 500 may include graphically depicting and/or visually presenting other types of information. The unified product page may include additional, less, or alternate functionality, including functionality discussed elsewhere herein.

The user interface may provide or facilitate the input, and/or viewing, of many features of the system and method for determining standard status messages discussed herein. A number of the exemplary user interface features and functionalities are discussed below.

A. Exemplary Product Bundle Area Functionality

The unified product page 500 may display a product bundle area 502, containing a product bundle with one or more products a customer has selected for purchase. The product bundle area 502 may display the number of items currently in the product bundle. The products in the product bundle may include, for example, an automobile insurance product, a renter's insurance product, a vehicle loan product, a condo insurance product, life insurance product, etc. Additionally, a price may be displayed for each product in the bundle.

The bundle area 502 may display one or more standard status messages 510 associated with the one or more products. In one aspect, the standard status messages may be taken from the exemplary listing of standard statuses listed in FIG. 4. One or more visual indicators 512 may also be displayed corresponding to the status. For example, in the unified product page 500 illustrated in FIG. 5A, a visual indicator 512 may correspond to the "pending" status.

The product bundle functionality may include the user interface being configured to allow a user to click on a user interface element to drill down to view more details and actions that may be taken. Drilling down may result in the user interface graphically depicting and/or visually representing, on the display screen, additional items for the insurance product. The additional items visually depicted may include coverage amounts, deductible amounts, discounts, etc.

B. Exemplary Bundle Checkout Area Functionality

The unified product page 500 may display a bundle checkout area 504 including a bundle price and one or more standard status messages 510. The bundle checkout area 504 may also display a bundle savings and the bundle products associated with the bundling savings. The bundle checkout functionality may include the user interface being configured to allow a user to click on a user interface element to drill down to view more details and actions that may be taken. Drilling down may result in the user interface graphically depicting and/or visually representing, on the display screen, additional details on the bundling savings, additional bundling savings, etc.

The bundle checkout area 504 may include functionality for and/or associated with completing a purchase of the product bundle. Such functionality may include a user interface element that may allow a user to purchase the items in the product bundle. The functionality may further include user interface elements for saving the product bundle and/or sending the product bundle to an agent.

C. Exemplary Agent Information Area Functionality

The unified product page 500 may display an agent information area 506. The agent information area 506 may also display the name of an agent associated with a customer, the agent's contact information, the agent's qualifications, etc. The bundle checkout functionality may include the user interface being configured to allow a user to click on a user interface element to drill down to view more details about the agent. The bundle checkout functionality may also include depicting and/or visually representing one or more user interface element to contact an agent, company employee, etc. via one or more communication methods, such as e-mail, instant messaging, etc.

D. Exemplary Additional Product Area Functionality

The unified product page 500 may display an additional product area 508. The additional product area 508 may include functionality for and/or associated with adding additional products to the product bundle. Such functionality may include a user interface element that may allow a user to add a product to the bundle. The additional product functionality may include the user interface being configured to allow a user to click on a user interface element to view more details and actions that may be taken. Drilling down may result in the user interface graphically depicting and/or visually representing, on the display screen, additional details on the product, price of the product, additional bundling savings, etc.

Although FIG. 5A illustrates an example embodiment of a user interface and related functionality of an example unified product page, the methods and system discussed in this application may be used with a variety of products, statuses, visual indicators, etc. The exemplary unified product page 500 may include additional, fewer, or alternate items, including those discussed elsewhere herein.

E. Exemplary Adjustment of Displayed Standard Message

Figure 5B:
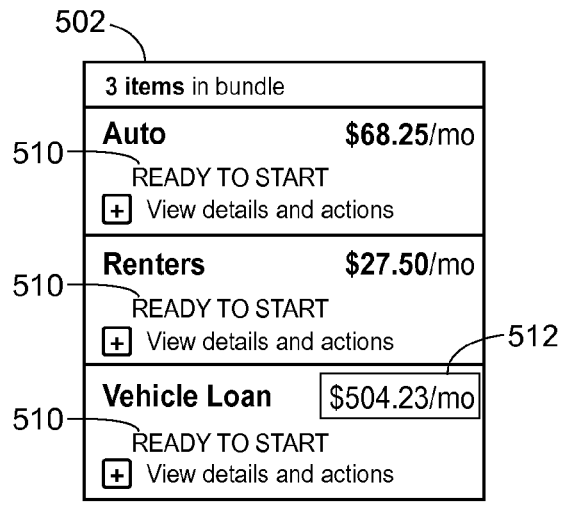
FIGS. 5B-5D illustrate an example product bundle area displaying standard status messages.
Figure 5C:
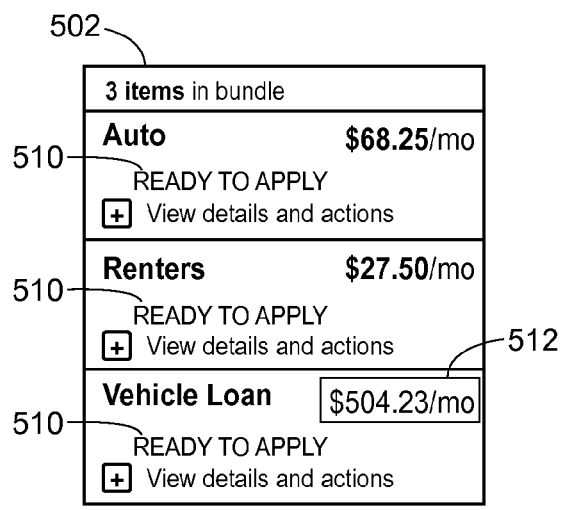
Figure 5D:
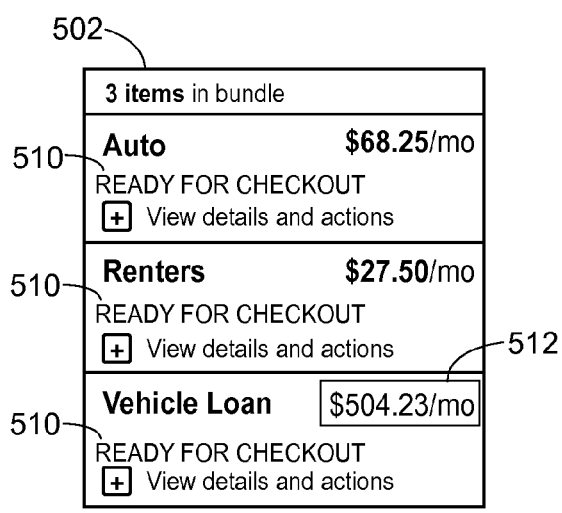

In one aspect, the one or more standard status messages 510 displayed within the bundle area 502 on the unified product page 500 may be automatically adjusted. FIGS. 5B-5D illustrate an exemplary user interface of an example product bundle area 502. The product bundle area 502 may also graphically depict and/or visually present other types of information.

FIG. 5B illustrates an exemplary bundle area 502 displaying a standard status message, "READY TO START," for three products in the product bundle: Auto Insurance, Renters Insurance, and Vehicle Loan. Of course, these are only example products and standard status messages may be generated for any combination of products, including other insurance and/or financial products, including those discussed elsewhere herein. In one embodiment, the standard status message may include text and/or an icon, such as a dynamically changing icon or text based upon the present or current status of purchasing, and/or applying for, the product or service. Other standard status messages may be used, including those with additional or alternate functionality and/or characteristics.

As described above in reference to FIG. 3, a standard status message corresponding to context may be determined and transmitted. In response to receiving a status message transmission, an updated standard status message 510 may be generated and/or displayed within the bundle area 502. For example, FIG. 5C illustrates the exemplary bundle area 502 after the standard status message 510 has been automatically adjusted to "READY TO APPLY" for each product in the bundle. FIG. 5D illustrates the exemplary bundle area 502 after the standard status message 510 has been automatically adjusted to "READY TO CHECKOUT," again for each product in the bundle.

FIGS. 5B-5D depict that each dynamic status icon or status message 510 for each of the three bundled products has been changed to reflect a current status of "Ready to Start," then "Ready to Apply," and then ultimately "Ready for Checkout." However, it should be noted that an individual dynamic status icon or status message 510 for each dedicated or specific product within the bundle may be dynamically updated and/or changed by itself or individually, i.e., statuses may be changed one at a time.

For instance, with respect to FIG. 5B, the dynamic status icon or status message 510 for an Auto Insurance product or service may read or be displayed as "Ready to Start." Simultaneously, the dynamic status icon or status message 510 for a Renters Insurance product or service may read or be displayed as "Ready to Apply," and/or a dynamic status icon or status message 510 for a Vehicle Loan product or service may read or be displayed as "Ready to Checkout." Status icons or messages 510 may also be displayed for other products or services within the bundle as well, such as Home Owners Insurance and other products/services discussed elsewhere herein. Also, the dynamic status icons or status messages 510 may include other current statuses, including those discussed elsewhere herein, such as "Not Started," "In Progress," "In Underwriting," "Ready to Customize," "Ready for Purchase," "On Hold," "Pending," "Contact Us," and/or "More Information Needed."

Also noted above, a status message may be transmitted in response to triggering an action, such as described in the description of the method 600. In some embodiments, the standard status icon or message 510 may be automatically adjusted for one or more other reasons including, receiving additional user information, one or more customer selections, an action from a company agent or representative, etc. FIGS. 5B-5D illustrate one exemplary graphical interface for depicting status icons or messages, and/or facilitating the online bundling of insurance products being purchased electronically, such as via the internet. Those of ordinary skill in the art can appreciate that other graphical depictions of standard status messages may be used.

VII. Exemplary Flowchart for Triggering an Action

Figure 6:
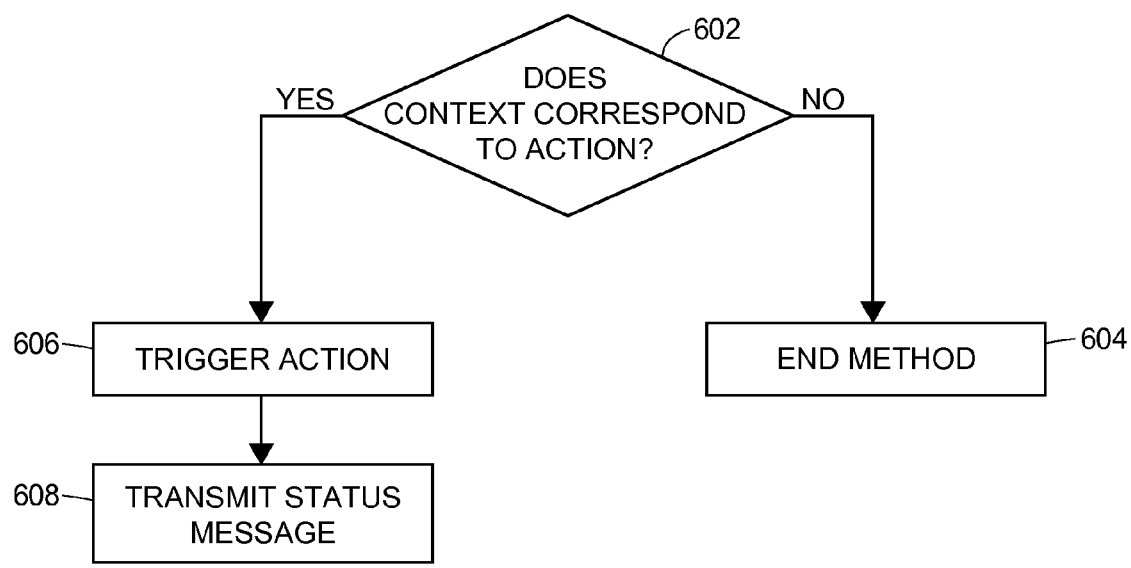
FIG. 6 is a flow chart illustrating an exemplary method for triggering an action based upon the context of a product application.

FIG. 6 is a high level flow chart of a method, routine or process 600 for triggering an action based upon the context of a product application. The method may be performed by on one or more servers, such as the server 110, described in reference to FIG. 1. A processor of a server (such as the server 110 illustrated in FIG. 1) may execute an instruction to determine a current context of the product application and a scenario corresponding to the current context. As discussed above, a list of possible scenarios for an insurance product application is listed in FIG. 4. Of course the scenarios on this list are only examples and those of ordinary skill in the art will recognize that a variety of statuses may be used. The processor may further execute an instruction to determine if one or more actions correspond to the determined context, scenario and/or standard status message. If the processor executing the instruction determines that no actions correspond (NO branch of block 604), the processor may execute an instruction to end the method (block 606). If the processor executing the instruction determines that one or more actions do correspond (YES branch of block 604), the processor may execute an instruction to trigger the action (block 608). The processor may further execute an instruction to transmit the status message for display on the client device (block 610). The exemplary method 600 may include additional, fewer, or alternate actions, including those discussed elsewhere herein.

For example, the processor executing the instruction may determine that the context of the application is that the application is approved, but the agent does not have the proper credentials to complete the application, such as amd66 compliance. Accordingly, the processor may determine that two actions correspond to this context. The first action may be that the application process is halted because of the lack of compliance and the second action may be to send a message to an amd66 compliant agent to complete the application. After determining these actions, the processor executing the instructions corresponding to the method 600 may further execute an instruction to generate an action status message explaining that the current agent is not compliant and that the application cannot be processed. In this manner, the customer is informed of why the application cannot be completed as opposed to a generic error message which may confuse and frustrate the customer. In another example, a scenario, context and/or standard status message may trigger an action to display a visual indicator in a unified product area, such as the unified product page 500 illustrated in FIG. 5A.

VIII. Exemplary Data Servers

Figure 7:
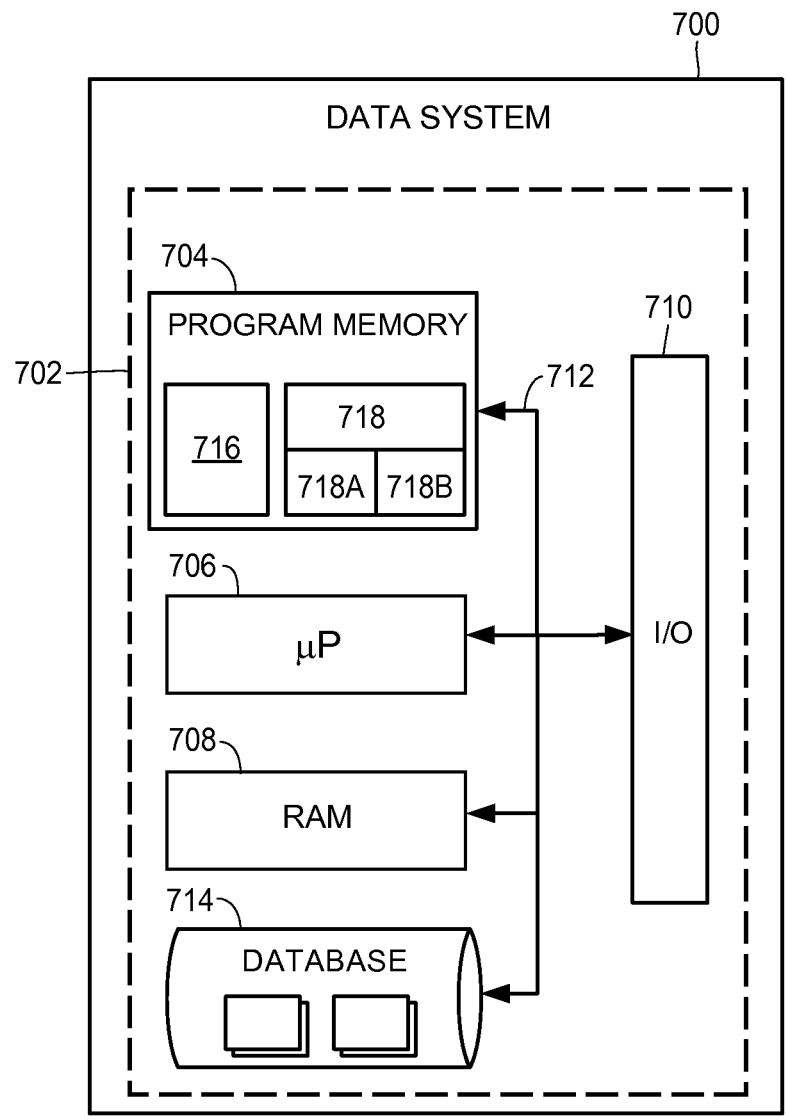
FIG. 7 is an exemplary architecture of a data system.

Referring now to FIG. 7, a data server 700 includes a controller 702. Exemplary data servers include the server 110 illustrated in FIG. 1. The controller 702 may include a program memory 704, a microcontroller or a microprocessor (μP) 706, a random-access memory (RAM) 708, and an input/output (I/O) circuit 710, all of which may be interconnected via an address/data bus 712. The program memory 704 may store computer-executable instructions, which may be executed by the microprocessor 706. In some embodiments, the controller 702 may also include, or otherwise be communicatively connected to, a database 714 or other data storage mechanism (e.g., one or more hard disk drives, optical storage drives, solid state storage devices, etc.). It should be appreciated that although FIG. 7 depicts only one microprocessor 706, the controller 702 may include multiple microprocessors 706. Similarly, the memory 704 of the controller 702 may include multiple RAMs 716 and multiple program memories 718, 718A and 718B storing one or more corresponding application modules, according to the controller's particular configuration. The data server 700 may also include specific routines to be performed by the data server 700.

Although FIG. 7 depicts the I/O circuit 710 as a single block, the I/O circuit 710 may include a number of different types of I/O circuits (not depicted). The RAM(s) 708, 704 and the program memories 718, 718A and 718B may be implemented in a known form of computer storage media, including but not limited to, semiconductor memories, magnetically readable memories, and/or optically readable memories, for example, but does not include transitory media such as carrier waves.

IX. Exemplary Computer-Implemented Methods

In one aspect, a computer-implemented method of dynamically displaying the current status of various insurance product (or service) offerings and/or associated applications to a user may be provided. The method may include (1) displaying a visual, textual, or graphical representation of a first insurance product (or service) and/or an associated first application on a display screen and/or user interface; (2) displaying a visual, textual, or graphical representation of a first status indicator on the display screen, the first status indicator representing a current status of the first insurance product (or service) and/or the associated first application on the display screen and/or user interface; (3) displaying a visual, textual, or graphical representation of a second insurance product (or service) and/or an associated second application on the display screen and/or user interface; and/or (4) displaying a visual, textual, or graphical representation of a second status indicator on the display screen and/or user interface, the second status indicator representing a current status of the second insurance product (or service) and/or the associated second application. The bundling or purchasing together of the first and second insurance products (or services) may reduce the overall cost of the first and second insurance products (or service) when compared to individually purchasing the first and second insurance products (or services). The method may allow the user to purchase a bundle of insurance or financial-related products or services via the display screen and/or user interface, such as a bundle including the first and second insurance products (or services). The method may allow the user to alter the scope and/or coverages of the insurance and/or financial-related products (or services) via operations performed on the user interface, such as by mouse click or touch screen.

Noted above, the method may include offering or presenting first and second insurance products (or services). The first and second insurance products (or services) may relate to auto, home, life, renters, and/or other types of insurance, and/or financial products, such as vehicle or personal loans. The first and second status indicators may include and/or indicate "Ready to Apply," "Not Started," "In Progress," "In Underwriting," "Ready to Customize," "Ready for Purchase," "On Hold," "Pending," "Contact Us," "More Information Needed," and/or another status, such as another status related to the products (or services) and/or an application for such products (or services).

The method may include displaying or presenting information related to a number of products for bundling purposes. For instance, a display screen and/or user interface may include functionality related to, and/or indicate or visually depict or represent a number of insurance and/or financial-related products or services grouped together in a bundle, such as shown in FIG. 5A.

The method may include displaying or presenting periodic premium or payment information. For instance, for each insurance and/or financial-related product or service visually represented, a corresponding monthly premium may be depicted. Additionally or alternatively, an annual cost of the product or service may be presented.

The method may include displaying or presenting additional information about the product or services being offered (and/or details of the associated applications). For example, a user interface may include functionality related to presenting additional details and/or actions. For instance, icons and/or text may be presented on the user interface that allows the user to learn and/or be presented with addition information regarding the insurance or financial product or service and/or associated application for the insurance or financial product or service.

The method may include displaying or presenting information regarding specific insurance agents or other sales representatives. For instance, agent name, contact information, and/or agent website information may be provided. Other types of customer assistance may be provided.

The method may include displaying or presenting functionality that allows a user to add (or subtract) an insurance or financial-related products or services to (or from) the bundle of current products and/or services that the user may be interested in purchasing. For instance, the user interface may allow a user to add, subtract, and/or modify products related to vehicle loans, renters insurance, condo insurance, home insurance, life insurance, and/or other products, including those mentioned elsewhere herein, for a bundle of products that includes auto insurance, renters or home insurance, and/or a vehicle loan (such as depicted in FIG. 5A).

X. Exemplary User Interfaces

In one aspect, a user interface presenting an integrated view of insurance products for sale may be provided. The user interface may include a display screen displaying: (1) a first status indicator associated with a first insurance product (or service) and/or a related first application (for the first insurance product or service); (2) a second status indicator associated with a second insurance product (or service) and/or a related second application (for the second insurance product or service); and/or (3) a third status indicator associated with a third insurance product (or service) and/or a related third application (for the third insurance product or service). The first insurance product or service may impact the pricing on the second and/or third insurance product or service, and/or vice versa.

The first, second, and third status indicators may indicate a status of applications for the first, second, and third insurance (or financial related) product (or service), respectively, as discussed elsewhere herein and directly above. For instance, the first status indicator may indicate that the user may currently apply for the first insurance product or service using the user interface, the second status indicator may indicate that the user may currently purchase the second insurance product using the user interface, and the third status indicator may indicate that the application for the third insurance product is pending, on hold, or in underwriting. The status indicators may indicate other statuses (including those discussed elsewhere herein), and the user interface may include other functionality, including that discussed elsewhere herein.

In another aspect, a graphical user interface for the online selling of a bundle of insurance-related (and/or financial-related) products or services may be provided. The graphical user interface may depict: (a) a graphical or visual representation of more than one insurance-related product or service (and/or corresponding application for such product or service); and/or (b) a graphical or visual representation of a current status for each of the more than one insurance-related product or service (and/or corresponding application for such product or service). The current status may depict a periodic payment or premium for a respective insurance-related product or service and/or a state of progress with respect to completing a purchase of (and/or application for) the respective insurance-related product or service. The graphical user interface may be configured to accept user modifications to each of the more than one insurance-related products or services, and each user modification may impact an overall price that the user will be charged if the bundle of insurance-related products or services is purchased together via the graphical user interface. The current status may be depicted by a status indicator that indicates "Ready to Apply," "Not Started," "In Progress," "In Underwriting," "Ready to Customize," "Ready for Purchase," "On Hold," "Pending," "Contact Us," or "More Information Needed."

The more than one insurance-related product or service may include one or more of auto insurance, home owners insurance, renters insurance, life insurance, a vehicle or personal loan product, and/or other combinations of insurance-related products or services, including those discussed elsewhere herein. The graphical user interface may further depict a savings, such as a dollar amount, associated with the bundling or insurance-related products or services. The user interface may include additional, less, or alternate functionality, including that discussed elsewhere herein.

XI. Additional Considerations

The following additional considerations apply to the foregoing discussion. Throughout this specification, plural instances may implement functions, components, operations, or structures described as a single instance. Although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The methods described in this application may include one or more functions or routines in the form of non-transitory computer-executable instructions that are stored in a tangible computer-readable storage medium and executed using a processor of a computing device (e.g., the computing device 104, the server 112, or any combination of computing devices within the system 100). The routines may be included as part of any of the modules described in relation to FIG. 1 or 2 or as part of a module that is external to the system illustrated by FIGS. 1 and 2. For example, the methods may be part of a browser application or an application running on the computing device 104 as a plug-in or other module of the browser application. Further, the methods may be employed as "software-as-a-service" to provide a computing device 104 with access to the quote system 110.

Additionally, certain embodiments are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain functions. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules may provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and may operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors), these operations being accessible via a network (e.g., the Internet) and via one or more appropriate interfaces (e.g., application program interfaces (APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Still further, the figures depict preferred embodiments of a computer system 100 for purposes of illustration only. One of ordinary skill in the art will readily recognize from the following discussion that alternative embodiments of the structures and methods illustrated herein may be employed without departing from the principles described herein.

Although the text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments may be implemented, using either current technology or technology developed after the filing date of this patent, which would still fall within the scope of the claims.

Upon reading this disclosure, those of skill in the art will appreciate still additional alternative structural and functional designs for System And Method For Determining A Standard Status Message. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

To the extent that any meaning or definition of a term in this document conflicts with any meaning or definition of the same term in a document incorporated by reference, the meaning or definition assigned to that term in this document shall govern. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. While particular embodiments of the present invention have been illustrated and described, it would be obvious to those skilled in the art that various other changes and modifications may be made without departing from the spirit and scope of the invention. It is therefore intended to cover in the appended claims all such changes and modifications that are within the scope of this invention.

What is claimed is:

1. A computer-implemented method for determining a standard status for each of a plurality of products and generating an interface for presenting such standard statuses to a user, the method comprising:

receiving, via a computer network, a customer identification;

receiving, via the computer network, selections of a first product and a second product offered by a company corresponding to the customer identification, wherein the first product is selected from a first product line of a plurality of product lines sold by the company and the second product is selected from a second product line of the plurality of product lines;

mapping, by one or more processors, each of a plurality of standard statuses to a plurality of successive statuses of each work flow in a plurality of application work flows of the plurality of product lines across the plurality of product lines, including application work flows of the first and second product lines;

determining, by the one or more processors, a first context of a first application for the first product, wherein the first context represents one of the successive statuses of a first work flow of the plurality of work flows associated with the first application for the first product;

determining, by the one or more processors, a first standard status of the first application from the plurality of standard statuses based on the first context;

generating, by the one or more processors, a first status message indicating the first standard status of the first application based upon the determined first context;

determining, by the one or more processors, a second context of a second application for the second product, wherein the second context represents one of the successive statuses of a second work flow of the plurality of work flows associated with the second application for the second product;

determining, by the one or more processors, a second standard status of the second application from the plurality of standard statuses based on the second context;

generating, by the one or more processors, a second status message indicating the second standard status of the second application based upon the determined second context;

based on the determined first and second standard statuses, transmitting, via the computer network to a client device, the first and second status messages associated with the received customer identification to facilitate presenting the first and second status messages via an online hub, wherein the online hub provides a centralized location to view the first and second status messages and the plurality of product lines sold by the company;

determining, by the one or more processors, an action to be triggered by the first context; triggering, by the one or more processors, the action in response to determining the first context of the application for the first product;

generating, by the one or more processors, an action status message explaining the action triggered by the first context;

transmitting, via the computer network, the action status message to the online hub; and presenting, by a display of the client device, the online hub as a user interface displaying a unified product page, comprising:

a product bundle area of the unified product page displaying information regarding a bundle of products including the first application for the first product and the second application for the second product, wherein the product bundle area displays a visual indicator associated with each of the first status message and the second status message, wherein the visual indicator is color-coded to indicate the respective standard status of the respective application, and wherein the product bundle area includes a user interface element configured to cause the product bundle area to display further actions to be taken with respect to at least one of the first product or the second product upon selection of the user interface element by the user; and a bundle checkout area of the unified product page displaying information regarding purchasing the bundle of products, wherein the bundle checkout area includes a standard status message regarding the bundle of products and a bundle price for the bundle of products.

2. The computer-implemented method of claim 1, wherein determining each of the first standard status and determining the second standard status further comprises:

selecting, by the one or more processors, the respective standard status from a group of statuses standardized across two or more product lines sold by the company, wherein the two or more product lines include at least one of: an insurance product, a banking product or a mutual fund product.

3. The computer-implemented method of claim 1, wherein the visual indicator is represented by an icon or text.

4. A computer device for determining a standard status for each of a plurality of products and generating a user interface for presenting such standard statuses to a user, the computer device comprising:

one or more processors; and one or more memories coupled to the one or more processors;

the one or more memories including non-transitory computer executable instructions stored therein that, when executed by the one or more processors, cause the one or more processors to:

receive, via a computer network, a customer identification;

receive, via the computer network, selections of a first product and a second product offered by a company corresponding to the customer identification, wherein the first product is selected from a first product line of a plurality of product lines sold by the company and the second product is selected from a second product line of the plurality of product lines;

map each of a plurality of standard statuses to a plurality of successive statuses of each work flow in a plurality of application work flows of the plurality of product lines across the plurality of product lines, including application work flows of the first and second product lines;

determine a first context of a first application for the first product, wherein the first context represents one of the successive statuses of a first work flow of the plurality of work flows associated with the first application for the first product;

determine a first standard status of the first application from the plurality of standard statuses based on the first context;

generate a first status message indicating the first standard status of the first application based upon the determined first context;

determine a second context of a second application for the second product, wherein the second context represents one of the successive statuses of a second work flow of the plurality of work flows associated with the second application for the second product;

determine a second standard status of the second application from the plurality of standard statuses based on the second context;

generate a second status message indicating the second standard status of the second application based upon the determined second context;

based on the determined first and second standard statuses, transmit, via the computer network to a client device, the first and second status messages to facilitate presenting the first and second status messages via an online hub, wherein the online hub provides a centralized location to view the first and second status messages and the plurality of product lines sold by the company;

determine an action to be triggered by the first context;

trigger the action in response to determining the first context of the application for the first product;

generate an action status message explaining the action triggered by the first context;

transmit, via the computer network, the action status message to the online hub; and cause the online hub to be presented as a user interface displaying a unified product page by a display of the client device, the online hub comprising:

a product bundle area of the unified product page displaying information regarding a bundle of products including the first application for the first product and the second application for the second product, wherein the product bundle area displays each of the first status message and the second status message, wherein the visual indicator is color-coded to indicate the respective standard status of the respective application, and wherein the product bundle area includes a user interface element configured to cause the product bundle area to display further actions to be taken with respect to at least one of the first product or the second product upon selection of the user interface element by the user; and a bundle checkout area of the unified product page displaying information regarding purchasing the bundle of products, wherein the bundle checkout area includes a standard status message regarding the bundle of products and a bundle price for the bundle of products.

5. The computer device of claim 4, further comprising non-transitory computer executable instructions to cause the one or more processors to:

select the each of the first standard status and determining the second standard status from a group of statuses standardized across two or more product lines sold by the company, wherein the two or more product lines include at least one of: an insurance product, a banking product or a mutual fund product.

6. The computer device of claim 4, wherein the visual indicator is represented by an icon or text.

7. A computer-implemented method for online selling of a bundle of insurance-related products or services, the method comprising:

providing, by one or more processors, a graphical or visual representation of more than one insurance-related product or service to be displayed via a graphical user interface, wherein the graphical user interface is configured to:

present a product bundle area of a unified product page displaying information regarding the bundle of insurance-related products or services, including the more than one insurance-related product or service, wherein the product bundle area includes a user interface element configured to cause the product bundle area to display further actions to be taken with respect to at least one of the more than one insurance-related product or service upon selection of the user interface element by the user;

present a bundle checkout area of the unified product page displaying information regarding purchasing the bundle of insurance-related products or services;

accept user modification to each of the more than one insurance-related product or service in the bundle of insurance-related products or services;

and modify a bundle price displayed in the bundle checkout area, wherein the bundle price is an overall price that a user will be charged if the bundle of insurance-related products or services is purchased together via the graphical user interface;

mapping, by the one or more processors, each of a plurality of standard statuses to a plurality of successive statuses of each work flow in a plurality of application work flows of the more than one insurance-related product or service across the more than one insurance-related product or service;

determining, by the one or more processors, a current standard status from the plurality of standard statuses for each of the more than one insurance-related product or service in the bundle of insurance-related products or services based upon a current status of an application work flow of each of the more than one insurance-related product or service;

determining, by the one or more processors, a context of a product or service of the more than one insurance-related product or service, wherein the context represents the current status of the application work flow of the product or service;

determining, by the one or more processors, an action to be triggered by the context of the application work flow;

triggering, by the one or more processors, the action in response to determining the context of the application work flow;

generating, by the one or more processors, an action status message explaining the action triggered by the context of the application work flow;

transmitting, via the computer network, the action status message to the online hub; and providing, by the one or more processors, a graphical or visual representation of the current standard status of each of the more than one insurance-related product or service to be displayed via the product bundle area of the graphical user interface, wherein the graphical or visual representation of the current standard status for each of the more than one insurance-related product or service is color-coded to indicate the current status.

8. The computer-implemented method of claim 7, wherein the current standard status for each of the more than one insurance-related product or service is depicted by a status indicator that indicates "Ready to Apply," "Not Started," "In Progress," "In Underwriting," "Ready to Customize," or "Ready for Purchase".

9. The computer-implemented method of claim 8, wherein the more than one insurance-related product or service includes auto insurance, home owners or renters insurance, and a vehicle loan product.

10. The computer-implemented method of claim 9, the graphical user interface further depicting a savings associated with the bundle of insurance-related products or services.

11. The computer-implemented method of claim 8, wherein the more than one insurance-related product or service includes auto insurance and home owners insurance.

12. The computer-implemented method of claim 8, wherein the more than one insurance-related product or service includes auto insurance and renters insurance.

13. The computer-implemented method of claim 8, wherein the more than one insurance-related product or service includes auto insurance and a vehicle loan product.

14. The computer-implemented method of claim 8, wherein the more than one insurance-related product or service includes home owners or renters insurance and a vehicle loan product.

15. The computer-implemented method of claim 7, the bundle checkout area of the graphical user interface further depicting a periodic payment or premium for at least one of the more than one insurance-related product or services.

* * * * *